(12) United States Patent
Varada et al.

(10) Patent No.: US 11,650,834 B1
(45) Date of Patent: May 16, 2023

(54) LEVERAGING DIGITAL FOOTPRINTS IN SOFTWARE DEVELOPMENT LIFE CYCLE

(71) Applicant: International Business Machines Corporation, Armonk, NY (US)

(72) Inventors: Sri Harsha Varada, Vizianagaram (IN); Sravani Madem, Visakhapatnam (IN); Manjit Singh Sodhi, Bangalore (IN); Prerna Agarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 17/567,409

(22) Filed: Jan. 3, 2022

(51) Int. Cl.
| | |
|---|---|
| *G06F 9/451* | (2018.01) |
| *G06F 8/60* | (2018.01) |
| *G06Q 10/067* | (2023.01) |
| *G06F 11/36* | (2006.01) |
| *G06F 8/65* | (2018.01) |

(52) U.S. Cl.
CPC ............... *G06F 9/453* (2018.02); *G06F 8/60* (2013.01); *G06Q 10/067* (2013.01); *G06F 8/65* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 10,620,964 B2 | 4/2020 | Kumar et al. | |
| 2014/0258968 A1* | 9/2014 | Brown | G06F 40/10 717/103 |
| 2019/0129712 A1* | 5/2019 | Hawrylo | G06F 8/20 |
| 2020/0125353 A1* | 4/2020 | Bean | G06F 8/65 |
| 2022/0405027 A1* | 12/2022 | Sodhi | G06F 3/1286 |

FOREIGN PATENT DOCUMENTS

IN 202111008557 A 3/2021

OTHER PUBLICATIONS

Bi, "An Empirical Study of Release Note Production and Usage in Practice", 2020, IEEE (Year: 2020).*

(Continued)

*Primary Examiner* — Hossain M Morshed
(74) *Attorney, Agent, or Firm* — Stephen J. Walder, Jr.; Steven M. Bouknight

(57) ABSTRACT

Mechanisms are provided for automatically generating a user interactable what-is-new feature for an updated application. The mechanisms obtain footprint data from electronic documents generating during a software development lifecycle to generate an update to an application, where the footprint data specifies development requirements and actions performed by at least application developers during the software development lifecycle. The mechanisms further obtain test case generation data from a recording of test case generation interactions with a graphical user interface and execute computer natural language processing on the footprint data and analysis of the recording of the test case generation interactions to automatically generate a what-is-new container for the update to the application. Moreover, the mechanisms deploy the what-is-new container to a client computing device that executes a container daemon to implement a what-is-new feature for the updated application installed on the client computing device.

20 Claims, 4 Drawing Sheets

(56) References Cited

OTHER PUBLICATIONS

Agrawal, Pulkit, "How to Announce New Features to Drive Product Adoption", Chameleon, accessed online Aug. 31, 2021, 21 pages.
Meshell, Jackie, "How GitLab is automating release generation in .gitlab-ci.yml", GitLab, May 7, 2020, 8 pages.
Moreno, Laura et al., "ARENA: An Approach for the Automated Generation of Release Notes", IEEE Transactions on Software Engineering, Revised Sep. 17, 2014, 22 pages.
Rungta, Krishna, "Locators in Selenium IDE: CSS Selector | DOM | XPath | ID", Guru99, Aug. 28, 2021, 27 pages.
Sanoj, S., "Video Recording of Selenium Automation Flow", RapidValue, May 13, 2020, 3 pages.
Vincent, James, "Samsung's 'artificial humans' are just digital avatars", The Verge, Jan. 7, 2020, 4 pages.
Wiggers, Kyle, "AI model creates 3D avatars from a person's picture", VentureBeat, Jun. 16, 2020, 7 pages.

* cited by examiner

US 11,650,834 B1

LEVERAGING DIGITAL FOOTPRINTS IN SOFTWARE DEVELOPMENT LIFE CYCLE

BACKGROUND

The present application relates generally to an improved data processing apparatus and method and more specifically to mechanisms for leveraging digital footprints in software development lifecycles.

In any software development life cycle (SDLC) as soon as the requirements for a feature of the software are acquired from the business level analysts, the development team will start working on implementing the feature in the software produce while the quality assurance (QA) team designs the testcase scenarios for testing the code implementing the feature. The testing team converts these testcases into an automated test suite where the test suite is executed. At each phase of development, the digital footprint is recorded by the respective teams. The digital footprint is a data trace of activities, actions, communications, or transactions occurring with regard to the development and/or testing of the software code.

Increasingly, more and more applications are emerging as society has become more reliant on computing systems and information technology. Each of these applications have a large number of features, which also increases with each release of the applications.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automatically generating a user interactable what-is-new feature for an updated application. The method comprises obtaining footprint data from electronic documents generating during a software development lifecycle to generate an update to an application, wherein the footprint data specifies development requirements and actions performed by at least application developers during the software development lifecycle. The method further includes obtaining test case generation data from a recording of test case generation interactions with a graphical user interface and executing computer natural language processing on the footprint data and analysis of the recording of the test case generation interactions to automatically generate a what-is-new container for the update to the application. Moreover, the method comprises deploying the what-is-new container to a client computing device that executes a container daemon to implement a what-is-new feature for the updated application installed on the client computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
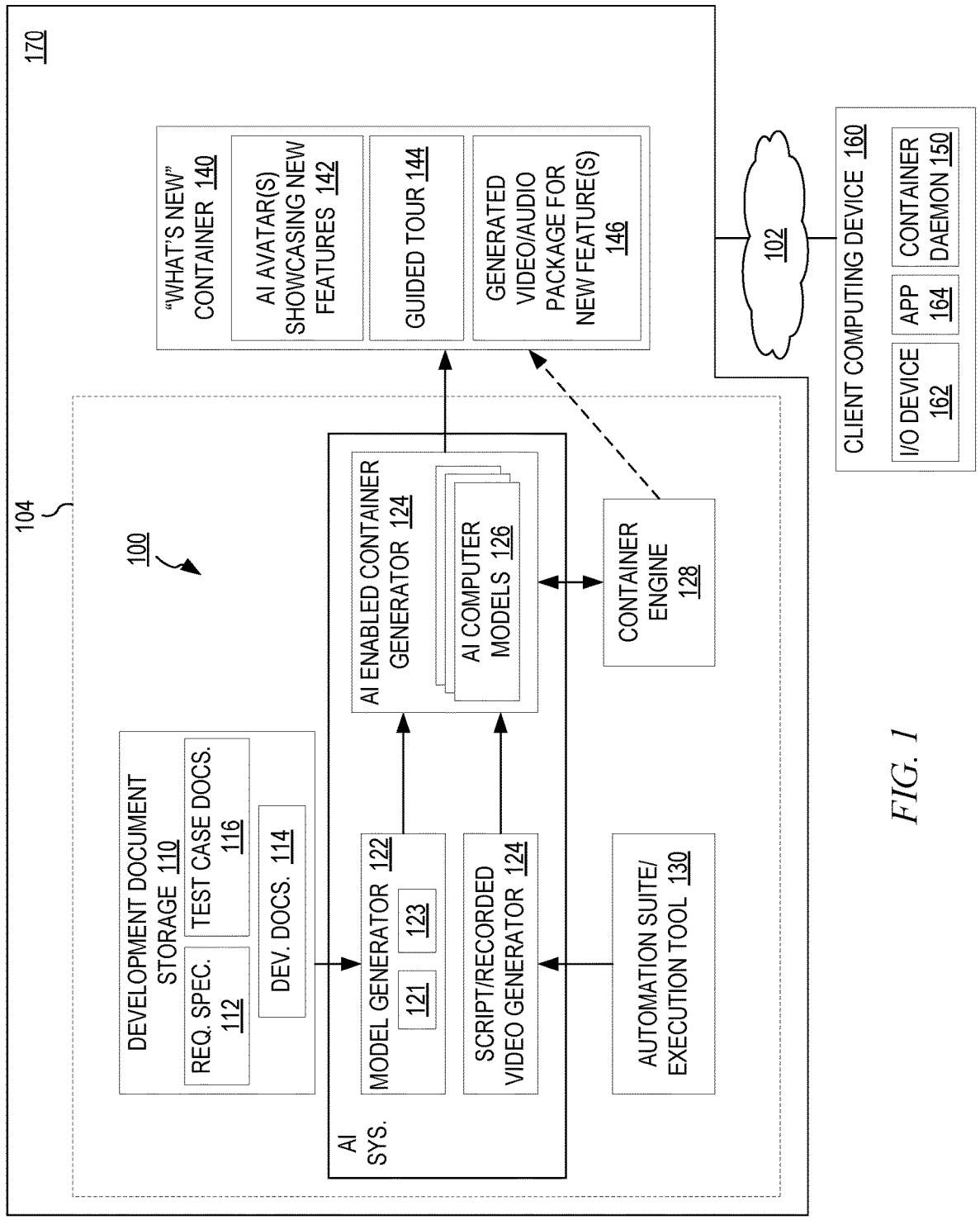
FIG. 1 is an example block diagram of the primary operational component of a digital footprint based "What's New" container generator in accordance with one illustrative embodiment.

As mentioned above, as more and more software applications emerge, and each of these applications comprise a lot of application features with each of the releases of the applications, end users are not always informed, in a manner easy for the users to access, of the new features provided in each release of the application. That is, the user may be aware that the application has been updated with a new release, but may not be aware of what new features are present in the new application release or understand the new features that are present in the new application release. Moreover, not all applications offer a "What-is-New" or "What's New" feature due to additional overhead and manual effort needed to implement such features. Thus, it would be beneficial to provide an improved computing tool that offers a "What's New" functionality as a plug-and-play service that can be used with any application can easily enable this feature without additional implementation overhead.

The illustrative embodiments provide an improved computing tool that automatically operates to identify digital footprints from various phases of a software development life cycle (SDLC) of a software application (hereafter referred to simply as an "application") and generates a container that holds a "What's New" application feature data structure and executable logic. The "What's New" application feature data structure and executable logic (hereafter referred to as a "What's New" container), provides the data and logic to create a virtual artificial intelligence (AI) avatar to assist the user with regard to new features using natural language conversation interaction either through text or spoken communication. The "What's New" container further generates a client-side script to drive a guided tour of the new features and any playback video for new features of the application.

As software development for a new feature of an application is initiated, a specification document data structure is generated and associated with the released feature to document the business level requirements for the new feature. Similarly, the development team maintains their own documentation, in a development documentation data structure, specifying their activities in the development of the code for the new feature. All of these document data structures will be associated with a tag corresponding to the new feature, i.e., new functionality, being added to the application and thus, can be correlated by the same functionality or feature tag. The feature tags may be specified by the individuals involved as they are performing their activities and documenting those activities in the data structures, or may be automatically generated through automated monitoring systems that identify user actions and correlate those user actions to predefined tags. These tags may be, for example, project codes, codes specifying types of activities, etc., or a combination of such tags. In some cases, a machine learning computer model may be trained to process the development document data structures to identify entries in the documentation data structures and correlate them to particular predefined tags.

The improved computing tool of the illustrative embodiments performs a textual analysis, such as a computer executed natural language processing (NLP), on all the available development document data structures, i.e., all specification document data structures, development document data structures, and the like, associated with the new feature development, and creates a new feature model that defines the crux of the functionality of the new feature. It should be appreciated that the new feature model is not an computer executable model but rather is a hierarchical computer model data structure that specifies the relationships and dependencies of functionalities of the application with regard to the new feature. The textual analysis extracts the descriptions of the various functionalities, their classifications, and their dependencies and a hierarchical model generator generates a hierarchical model representation of these functionalities. The new feature model, or simply "model" hereafter, can be used for generating audio and/or video content that may be output via an audio/video output device, or an input feed for an artificial intelligence (AI) avatar mechanism provided via AI logic and output through a computer audio/video device, as described hereafter.

Once the new feature code is ready for testing, an automation team creates the test cases for the new feature. The test cases are compiled into a test suite which is also associated with the functional tag of the new feature. An automation test case will identify the elements on the screen/in the application that are part of the test case using selector detection and tracking techniques. The selectors, e.g., graphical user interface elements, that are selected while running the test cases, are detected as part of the performance of the test case and are recorded against the specific feature, i.e., associated with the new feature tag. The recording may be stored as a data structure, such as a log of activities performed to generate the test case, which may be used as a playback mechanism to execute the test case. The recorded selectors are then provided to an executable generator tool that transforms the received selectors from the test case to an executable script. One example of an executable generator tool that may be used to generate the executable script is the Selenium IDE available from Microsoft Corporation. Moreover, either alternative to, or in addition to, the generation of the executable script, a recorded video generator may generate video content representing an interaction with the new feature of the application based on the test case, e.g., a video representation of a user interacting with a graphical user interface (GUI) to utilize the new feature. That is, the improved computing tool of the illustrative embodiments may record the execution of the test case or test suite, such as while performing selector recording, and this recording may be in a video format.

The script and/or generated video may be used to generate a customized guided tour of the new feature when presenting the "What's New" feature to a user at the user computing device based on the "What's New" container, as described hereafter. The customized guided tour includes any application skins, navigation animations, as well as any other graphical, textual, audio, etc. content that provide a guided tour of the new functionality.

By generating the new feature model and the recorded test suite, the improved computing tool of the illustrative embodiments dynamically and automatically generates the What's New feature definition from the development documentation data structures and test case generation environment. A machine learning trained AI computer model operates on the new feature model and the executable script/recorded video to generate a what's new feature container that may include a guided tour functionality, an AI avatar functionality, and multimedia package for demonstrating the new feature to a user of the updated application.

That is, the generated new feature model, executable computer model and the multimedia content, e.g., the recorded video (which may also include audio content), are provided as input to a container generation engine which generates a "What's New" container that may be deployed to client computing devices along with the updates to the application to thereby automatically and dynamically generate a "What's New" functional component at the client computing device. The container that is generated is not part of the actual development cycle for the new feature of the application, but rather is automatically provided by the improved computing tool of the illustrative embodiments as a service based on the development documentation and the recording of the test case generation either as an executable script, a recorded video/audio content, or a combination of the executable script and video/audio. The deployment of this container will fall in line with the actual release cycle of the new feature for the application such that the "What's New" functionality provided by the "What's New" container executes in parallel to the functional release. From the product/application development standpoint, there is a onetime operation to allocate a required portion of the application display, e.g., GUI real estate, for use by the "What's New" functionality of the service provided by the improved computing tool of the illustrative embodiments, link the allocated portion of the application display with the "What's New" container, and import the required theme and skins of the "What's New" feature.

Once the application display portion has been allocated, the "What's New" container is linked, and the required theme/skins are imported, whenever there is a new release with new functionality implemented in the application, the "What's New" container may be automatically executed to provide an automatically generated "What's New" functionality for the new release and new functionality, including video content demonstrating the operation of the new feature as indicated by the recorded selectors associated with the new feature. Thus, an automated mechanism for generating content to explain and demonstrate new functionality of an application release is made possible.

In some illustrative embodiments, the "What's New" container comprises computer executable logic that provides an artificial intelligence (AI) avatar, in addition to or instead of the video content, to demonstrate the new features and which utilizes natural language conversation with natural expressions. In such a case, natural language processing tools, text-to-audio conversion tools, conversational bot services, and the like, may be used to provide an AI avatar interaction. The AI avatar may be personal to the user in that historical interactions with the AI avatar, e.g., content of previous conversations or interactions with the AI avatar, may be recorded and stored in a user profile in association with the container daemon used to execute container logic, including the AI avatar logic for the "What's New" container. As a result, the AI avatar logic may analyze the historical interactions to determine correlations between current interactions and previous interactions in order to customize the AI avatar to the particular user. Thus, the conversation(s) between the user and the AI avatar may be recorded and stored in association with the user profile such that the user can, in future conversations with the AI avatar, reference past conversations regarding the newly released feature.

In some illustrative embodiments, the "What's New" container comprises logic that generates a guided tour of the new features of a release of the application. In such illustrative embodiments, the "What's New" container holds the executable client side script, which explains the new feature by navigating through the application along with associated help text while on navigation. The executable client-side script is generated based on the element selectors used by the automation team while automating the new feature, as described above. The associated text is generated by the feature hierarchical model generated using the development documentation from the various development teams. That is, portions of the client-side script are mapped to portions of the text extracted from the development documentation, where this mapping is performed by the machine learning trained AI mechanisms that generate the "What's New" feature. Thus, when the guided tour executes the executable script, as the portions of the script are executed, the corresponding textual descriptions from the development documents are used to generate textual descriptions of what is being represented in the execution of the script. The generation of the textual descriptions may utilize textual templates that are populated by the textual content extracted from the development documents and correlated with the portions of the executable script.

In some illustrative embodiments, the "What's New" container provides a play back video of a screen recording with associated audio, explaining the new feature. The video content is generated from the recording the feed of automation test case screen recordings, as previously described above. Audio content is generated from the feature hierarchical model based on the development documentation, similar to the textual description generation for the guided tour. In this case, however, the audio content may be generated by taking the textual descriptions and generating audio data by using a text-to-speech conversion operation, for example. Thus, as the video playback of the recording of the test case screens is being presented to the user, an audio voiceover may be output as well describing what is being shown in the video playback.

To further illustrate the improved computer functionality provided by the improved computing tool of the illustrative embodiments, consider the following scenario. Assume that a product manager, Manjit, has generated an application feature requirement to create an emoji feature in the product ABC, e.g., a client has asked for an emoji feature and the product manager generates the application feature requirement specification documentation from the client's request. Manjit produces the required specification document with all business cases specified indicating what the new functionality of the application needs to be able to do.

A developer, Harsha, takes this new feature requirement specification documentation and implements the new feature in code, documenting the activities that Harsha takes to generate the new feature's code, thereby generating a second documentation of the new feature. Once the code is ready, it is deployed to the testing environment where an automation engineer, Sravani, takes the feature requirement specification documentation and the second documentation generated by Harsha and starts writing automation test cases for the same feature. The development documentation generated by Manjit, Harsha, and Sravani, are processed via natural language processing computer logic, machine learning trained AI mechanisms, and hierarchical model generator logic, to generate a hierarchical computer model representation of the new feature or functionality of application, where this hierarchical computer model describes the relationships and dependencies of the new feature in combination with existing features of the application.

In addition, the illustrative embodiments provide an improved computing tool that implements a plugin to the integrated development environment (IDE) in which the code generation and test case generation is performed, through which the illustrative embodiments record the automation test case steps and identifies/records the element locators of the selectors associated with the test cases, to thereby generate an executable script to replay the recorded events. In addition, video content may be recorded while the automation test case is running. These element locators are used by the "What's New" container of the illustrative embodiments to automatically generate a guided tour and/or multimedia package for playback at the client computing device. The illustrative embodiments receive the documentation produced by Manjit (product manager), Sravani (automation engineer), and Harsha (developer) along with the recorded automation selectors and the recorded video. The illustrative embodiments perform machine learning trained AI operations on this information to correlate portions of the executable script, with portions of the hierarchical computer model and extracted text from the development documentation, and optionally portion so the recorded video, and produce an output of a "What's New" container for the new feature, which is tied to the new feature for deployment of the new feature to the existing application instances at client computing devices.

This "What's New" container may provide one or more types of "What's New" content based on the desired implementation. For example, Prerna, who is an end user, can make use of the "What's New" container functionality in one or more of a plurality of implementations based on configuring the improved computing system to generate a "What's New" container that generates a desired type of "What's New" content. While three different embodiments will be described, it should be appreciated that other embodiments will implement the "What's New" content in a different manner, or may combine two or more of these described embodiments, without departing from the spirit and scope of the present invention. In one illustrative embodiment, the "What's New" content may be provided as an AI avatar. In another illustrative embodiment, the "What's New" content may be provided as a guided tour. In yet another illustrative embodiment, the "What's New" content may be provided as a recorded multimedia, e.g., video and audio, playback.

Prerna, when she has configured the "What's New" container with the first option for "What's New" content, and when she clicks on the "What's New" feature in the applications' displayed interface, is presented with an AI based avatar with which she can speak or type commands and/or ask questions, such as "tell me the about the new feature offered." The AI avatar may implement natural language processing, speech-to-text, and text-to-speech functionality, as well as artificial intelligence (AI) processing of such speech/text to generate answers. Such functionality is similar to functionality provided by cognitive computing systems, such as provided via an IBM Watson™ system, available from International Business Machines Corporation of Armonk, N.Y., or modern smart devices and smart assistants available in mobile communication devices, such as Apple Siri™ available from Apple Corporation, Cortana™ available from Microsoft Corporation, Alexa™ available from Amazon, or the like. The AI avatar responds to the command/question by explaining the new emoji functionality within the product (application), such as where and how it is used. The responses utilize the correlations of the extracted text from development documents, hierarchical feature computer model, and/or recorded executable script and/or video content as a corpus of information upon which the AI mechanisms may operate to generate answers or responses to the received questions/requests from the user. In some illustrative embodiments, this AI avatar may operate as a conversation bot with which the user converses through speech and/or text input and which may utilize the corpus of information as a knowledge base for formulation of responses.

In some illustrative embodiments, for the queries that cannot be handled by the AI Avatar, the AI avatar may dynamically guide users with a floating chat window to an appropriate user from development/tester teams who is associated with that feature. That is, if the AI avatar engine cannot identify an answer or response with a predetermined threshold level of confidence, the AI avatar engine may redirect the user's conversation to a human being using predefined configuration information, by automatically establishing a new connection to the human developer/test team member's computing device where the human developer/test team member may continue the conversation and attempt to answer the user's question or provide a satisfactory response to the user's request. By doing so, end user satisfaction is improved along with product adoptability.

In the case where Prerna configures the "What's New" container with the second option, a guided tour will be shown, which uses the element selectors recorded during the execution of the test cases and the resulting executable script that is generated. The guided tour, in this case, shows the new emoji feature in the application and its use by executing the script in a demonstration version of the application that does not change the state of the client computing device. That is, a "dummy" version of the application may be generated in which the executable script may be executed to demonstrate the new feature, but which does not change the functioning state of the client computing device and thus, does not appreciably affect the way that the client computing device operates. This "dummy" version of the application is provided for presentation purposes only to demonstrate the new feature. The execution of the script may also be accompanied by textual pop-ups or text boxes that describe what is being shown in the execution of the script. The content of the textual pop-ups or text boxes may be automatically generated from the text extracted from the development documents and templates populated with the extracted text from the development documents, where this extracted text is correlated with portions of the executable script and the hierarchical feature computer model by the machine learning trained AI mechanisms of the illustrative embodiments.

Lastly when Prerna configures the "What's New" container with the third option, a recorded multimedia demonstration of the new emoji will be presented, such as by playback of a recorded video from the IDE along with the audio descriptions. The audio descriptions may be generated in a similar manner as the textual content for the guided tour with the addition that the textual content may be converted to audio data for audible output by using a text-to-speech conversion operation, for example.

In some illustrative embodiments, as a further feature, the improved computing tool of the illustrative embodiments may provide the "What's New" container as a service to app-based frameworks where the user only needs to update the application in their client device from an application distribution service prior to updating the application to implement the new feature. In this case, the application may be provided with a container daemon process, such as a Docker daemon or other virtual container process that operates to implement virtual containers, that may be specific to "What's New" containers. Thus, when a new feature is generated for the application, the illustrative embodiments may push/update the application with the specific "What's New" container for the new feature, thereby implementing the associated AI Avatar, guided tour, multimedia package, and executable logic of the "What's New" container as a new feature functionality of the application. Thus, the user can experience the "What's New" feature content for the new feature of the application prior to updating the application itself. In such a situation, the user is able to experience the new feature even without updating the application so that the user can determine whether they actually want the new feature or not and can update, or not update, the application accordingly.

As can be appreciated from the above description, the generated "What's New" container may be deployed at any desired point in the application development cycle. The generated "What's New" container will be placed on to the release cycle upon approval from the corresponding team/individual associated with the development of that specific feature creation.

The automated "What's New" container generation computing tool of the illustrative embodiments provides a pluggable service that can be implemented with any application to automatically generate the "What's New" content for use by end users. That is, after performing an initial configuration of the application to provide a portion of the display to present the "What's New" content, link the "What's New" container with the application via a virtual container daemon process, and import any required skins/themes, any time an application is provided with a new feature, the "What's New" container mechanisms can be used to automatically generate and output the "What's New" content, such as in the form of an AI avatar, a guided tour, a multimedia playback, or the like, for that new feature. The application developer need only push the "What's New" container for the new feature to the application users for this "What's New" content to be automatically generated and output, without having to separately generate this "What's New" content while developing the new application features, and without having to manually recreate the "What's New" feature for each different application. This provides a cost and manpower savings on the part of the application developer and provides an improved end user experience by providing a "What's New" feature and content for the application which otherwise may not have one due to the costs and manpower involved.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, and the description set forth hereafter, it is apparent that the present invention is implemented as a specifically configured improved computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides automated "What's New" application functionality through an automated artificial intelligence (AI) system that operates on development documentation and recordings of test case selector identifiers to generate a "What's New" feature for applications in a pluggable manner. The improved computing tool implements mechanism and functionality, which cannot be practically performed by human beings either outside of, or with the assistance of, a technical environment, such as a mental process or the like. The improved computing tool provides a practical application of the methodology at least in that the improved computing tool is able to automatically, and through artificial intelligence based mechanisms, generate a "What's New" functionality in any application into which the mechanisms of the illustrative embodiments are integrated.

It should further be appreciated that the illustrative embodiments of the present invention are specifically directed to this improved computing tool for automatically generating the "What's New" feature functionality in applications. All of the functions of the illustrative embodiments as described herein are intended to be performed using automated processes without human intervention. While a human being, e.g., an end user, may benefit from the result of the operation of the illustrative embodiments, the illustrative embodiments of the present invention are not directed to actions performed by the user, but rather logic and functions performed specifically by the improved computing tool. Moreover, even though the present invention may provide an output that ultimately assists human beings in understanding and utilizing new features released in updates to applications, the illustrative embodiments of the present invention are not directed to actions performed by the human being viewing or using the output, but rather to the specific operations performed by the specific improved computing tool of the present invention which facilitate the automated generation of the "What's New" feature functionality in an improved manner and ultimately the generation of the automated "What's New" feature functionality that assists the human being. Thus, the illustrative embodiments are not organizing any human activity, but are in fact directed to the automated logic and functionality of an improved computing tool.

As discussed above, the illustrative embodiments provide an improved computing tool that provides an artificial intelligence (AI) computing system that automatically generates a "What's New" functionality for applications from the development documentation and test case selector recordings. The illustrative embodiments are specifically directed to an improved computing tool and as such, are implemented specifically in specifically configured computing devices that are specifically configured to include the computer functionality described herein. The illustrative embodiments take development documentation from developers, test case generators, and the like, as well as recordings of selectors during execution of test cases, to generate "What's New" functionality content that can be provided in a virtual container mechanism.

FIG. 1 is an example block diagram of the primary operational component of a digital footprint based "What's New" container generator in accordance with one illustrative embodiment. It should be appreciated that the implementation of these operational components may involve several other non-depicted components to provide the underlying functionality and resources upon which the depicted components are built and operate. For example, FIG. 1 does not depict all the processors, memories, communication interfaces, storage systems, data libraries, drivers, operating systems, and the like, which may serve as a computing infrastructure upon which the depicted components operate, but these components are considered to be present to facilitate the describe functionality.

The digital footprint based "What's New" container generator 100 may be part of, or otherwise operates in conjunction with, a "What's New" container service 104 hosted on one or more server computing systems 170 accessed by client computing device(s) 160 via one or more data networks 102. The "What's New" containers may be pushed to the client computing device(s) 160 or may be pulled by the client computing device(s) 160 in response to requests from the client computing device(s) 160 for a "What's New" container feature. In some illustrative embodiments, the client computing device(s) 160 may be pre-registered with the service 104 and thus, may be configured to receive and execute at the client computing device 160 any "What's New" containers sent to the client computing device for one or more applications 164 installed on the client computing device 160.

As shown in FIG. 1, the primary operational components of the "What's New" container generator 100 include a development documentation storage 110, an artificial intelligence (AI) enabled container generator 120, and automation suite/execution computing tool 130. The AI enabled container generator 120 comprises a new feature model generator 122 which in turn comprises natural language processing computer logic 121 and machine learning trained hierarchical model generator 123, a script/recorded video generator 124, and one or more machine learning trained AI computer models 126 that are machine learning trained to correlate portions of the extracted text from the development documentation, portions of the generated hierarchical feature computer model, and portions of the executable script/recorded video and generate "What's New" container content for providing one or more of an AI avatar, guided tour, or multimedia package. The "What's New" container generator 100 generates a "What's New" container 140 that provides a dynamic "What's New" functionality that can be plugged into an existing instance of the application 164 on a client computing device 160 so as to automatically enable a "What's New" functionality when new features are released in updates or new versions of the application.

The "What's New" functionality comprises output content that demonstrates the functionality of a new feature added to an existing application, with this output content taking different forms depending on the desired implementation. For example, the "What's New" functionality may be realized by the user at the client computing device 160 as output via one or more input/output devices 162 associated with the client computing device 160 an AI avatar, a guided tour, a multimedia (e.g., video/audio) package, or the like, such that the user of the client device 160 is automatically provided information regarding the new feature(s). Moreover, the input/output devices 162 provide interfaces through which the user of the client device 160 may interact with the "What's New" content, e.g., provide spoken or textual questions (such as via a chat bot, AI avatar interaction, or the like), select areas of interest during a guided tour, and/or control the playback of multimedia (e.g., video/audio) content. The "What's New" functionality operates to inform the user of the client computing device 160 of the new functionality of the new feature, as well as how to use this new functionality via the updated application.

The "What's New" functionality is achieved automatically by the mechanisms of the illustrative embodiments by utilizing artificial intelligence (AI) analysis of the development footprint, e.g., the development document data structures and test case generation recordings, for the new feature as a source of information to automatically generate "What's New" content. This footprint is stored in the form of documentation in the development documentation storage and executable scripts/recorded video from the automated suite or integrated development environment (IDE). That is, the development documentation storage 110 stores the electronic documents in which individuals, engaged in the development of a new feature of an existing application, document the activities that they engage in while defining the new functionality of the new feature, coding the new feature, and testing the code of the new feature. The documentation may include documentation generated by business level individuals for indicating the business level specification of the desired functionality for the new feature (requirements specification) 112, developer level documentation by coders and the like that are involved in the actual coding of the new functionality as a new feature for the application (dev docs) 114, and documentation generated by the testers that generate test cases and test suites for testing the new functionality to ensure that it is operating properly (test cases docs) 116.

The documentation may be structured and/or unstructured, and is able to be parsed and analyzed using one or more textual analysis computing tools to extract text/features of interest for generating a hierarchical feature computer model of the new feature. For example, in the case of unstructured natural language textual documentation, the documents contain natural language descriptions upon which computer natural language processing (NLP) mechanisms may operate to parse and extract natural language features that are indicative of various characteristics of the new feature functionality, code, and testing that are indicative of new feature content that can be represented in a "What's New" output. The NLP mechanisms may be configured to specifically parse these types of documents using established domain specific dictionaries to identify key terms/phrases in documentation indicative of new features and indicative of relationships or dependencies between functionality or features of an application under development. The documentation 110-116 for the new feature provides a footprint for the new feature development that is leveraged by the mechanisms of the illustrative embodiments to automatically generate the "What's New" container and "What's New" functionality in the client side application instances.

The new feature model generator 122 of the artificial intelligence (AI) enabled container generator 120 provides computer executed logic to extract text/features from the documents 110-116 stored in the development documentation storage 110 and generate a hierarchical feature computer model of the new feature. The extraction of text/features may be performed using the NLP logic 121 of the new feature model generator 122 which provides these extracted features to a machine learning (ML) hierarchical model generator 123 that is trained through machine learning processes to correlate patterns of input features, e.g., text/feature extracted from the documentation 110-116, to classes of functionality and classes of relationships, and then based on this classification generate a hierarchical computer model, e.g., dependency tree type computer model, that defines the features/functionality of the application and the relationships/dependencies between the features/functionality. For example, the ML hierarchical computer model generator 123 may identify text/features indicative of the new feature, and text/features indicative of portions of the application that call the new feature or that are called by the new feature in the application logic flow, and these relationships may then be used to represent the functions of the application as nodes and edges (nodes representing functionalities or features and edges representing relationships or dependencies) in a hierarchical computer model showing dependencies between the functionality/features.

The new script/recorded video generator 124 of the AI enabled container generator 120 operates in conjunction with the automation suite/execution computing tool 130 used during new feature code development, to record interactions with user interface elements, e.g., selectors, and identify the selectors interacted with during testing of the code generated for the new feature. That is, a user or automated code may execute one or more test cases of a test suite generated by the testers to test the code generated for the new feature by the coders. As these test cases are executed via the automation suite/execution computing tool 130, the interactions with the application components and automation suite/execution computing tool 130 are recorded and the components, selectors, etc., interacted with and the particular type of interaction may be identified. The information gathered from the automation suite/execution computing tool 130 is processed by the new script/recorded video generator 124 to generate an executable script and video content corresponding to the operation of the new feature.

The one or more AI computer models 126 comprise computer logic that is trained through machine learning processes to operate on features from the hierarchical feature computer model generated by the model generator 122 and features from the script/video generated by the new script/recorded video generator 124. The one or more AI computer models 126, as well as other AI computer models such as in the model generator 122 or elsewhere in the depicted framework, may comprise convolutional neural networks (CNNs), deep learning neural networks (DNNs), support vector machine (SVM), decision tree mechanisms, generative adversarial networks (GANs), multilayer perceptron artificial neural networks, or the like. The machine learning processes may involve supervised or unsupervised machine learning. For example, the AI computer models 126, and/or other AI computer models in the framework, may be trained via machine learning operations based on a set of known input features and a ground truth or known correct output, and minimizing a loss function over multiple epochs of training until the training converges or a predetermined number of epochs have occurred at which point the model(s) are considered to have been trained. In particular, the AI computer models 126 are specifically trained through a machine learning process to correlate patterns of input features extracted from the hierarchical feature computer model and the executable script/video recording to correlate portions of the hierarchical feature computer model, and the supporting extracted textual content/features from the documentation 110-116 extracted by the model generator 122, with portions of the executable script and/or recorded video content. As noted previously, one mechanism for performing such correlations may include use of tags and recognized textual content in the documentation 110-116 with corresponding features in the executable script/video recording. In some cases, image analysis of the video recording may be utilized to identify and classify content of the video recording and correlate the classification or identification of the content with tags or textual features extracted from the documentation 110-116 and/or the executable script.

In some cases, the one or more AI computer models 126 may comprise a plurality of AI computer models 126, each AI computer model being trained through a machine learning process to perform a separate type of classification and correlation of input features. For example, a first AI computer model may be trained to correlate tags from the documentation 110-116 with terms/phrases present in the executable code language of the executable script. A second AI computer model may be trained to perform image analysis of recorded video to classify content of the recorded video and correlate the classification with terms/phrases extracted from the documentation 110-116 and correlated with features/functions represented in the hierarchical feature computer model. Additional AI computer models 126 may be provided to perform other correlations and artificial intelligence based analysis of features from the documentation 110-116, hierarchical feature computer model, executable script, and/or recorded video, without departing from the spirit and scope of the present invention.

The one or more AI computer models 126 may generate outputs that are provided to a container engine 128 that operates to automatically generate the "What's New' container 140. The container engine 128 comprises the logic and resources to generate virtual containers for distribution to client computing devices 160. The container engine 128 may operate using a client-server architecture and may include a container daemon process operating as a server that creates and manages containers, one or more application programming interfaces (APIs) used to instruct the daemon process as to what to do, a template registry that stores container templates that may be used as a basis for generating containers, and a container registry where container images are stored. The generated "What's New" containers 140 may be stored in the container registry as well as pushed or otherwise transmitted to the client computing device 160. In one illustrative embodiment, the container engine 128 may be a Docker container engine and the generated containers may be Docker containers. While Docker containers may be one way of implementing the self-contained functionality and data for presenting a "What's New" feature, other virtual container technologies may also be used without departing from the spirit and scope of the present invention.

The "What's New" container 140 that is generated by the mechanisms of the illustrative embodiments may include executable logic and data as a self-contained package that is distributed to a client computing device 160. The client computing device 160 has already been registered for push/pull service or otherwise accesses the "What's New" container service to request the "What's New" container from the service. In some illustrative embodiments, the client computing device 160 registers with the service and configures the client computing device to execute a container daemon 150 that executes containers 140 that are received. This configuring may comprise allocating portions of application 164 output displays for presentation of any AI avatars, guided tours, and/or multimedia (e.g., video/audio) playback content and links the application 164 with the "What's New" container 140. The container daemon 150 executes the received container 140 to generate a "What's New" content output via the one or more input/output devices 162 associated with the client computing device 160.

As discussed above, as software development for a new feature of an application is initiated, a specification document data structure 112 is generated and associated with the released feature to document the business level requirements for the new feature. Similarly, the development team maintains their own documentation, in a development documentation data structure 114, specifying their activities in the development of the code for the new feature. Furthermore, the test case generators may generate their own documentation 116 specifying the test cases that are to be performed to test the new feature functionality. All of these document data structures 112-116 will be associated with one or more tags corresponding to the new feature, i.e., new functionality, being added to the application 164 and thus, can be correlated by the same functionality or feature tag. The model generator 122 of the "What's New" container generator 100 performs a textual analysis on all the available development document data structures 112-116 associated with the new feature development and creates a computer executed model that holds the crux of the functionality of the new feature. The model can be used for generating audio and/or video content that may be output via an audio/video output device 162, or an input feed for an artificial intelligence (AI) avatar mechanism provided via AI logic and output through a computer audio/video device 162.

Once the new feature code is ready for testing, an automation team creates the test cases for the new feature. The test cases are compiled into a test suite which is also associated with the functional tag of the new feature. An automation test case will identify the elements on the screen/application using selector detection and tracking techniques. The selectors, e.g., graphical user interface elements, that are selected while running the test cases via the automation suite/execution computing tool 130, are detected as part of the performance of the test case and are recorded against the specific feature, i.e., associated with the new feature tag. The recorded selectors are then provided to the script/recorded video generator 124 that transforms the received selectors from the test case to an executable script, which may be associated with a customized guided tour functionality defined by the application via the "What's New" container 140 as described herein. The customized guided tour provided by the "What's New" container 140 includes any application skins, navigation animations, as well as any other graphical, textual, audio, etc. content that provide a guided tour of the new functionality.

In some illustrative embodiments, the script/recorded video generator 124 further generates a video recording of the test case execution. That is, the script/recorded video generator 124 records the execution of the test suite, while performing selector recording, in a video format.

The generated hierarchical feature computer model, the executable script, and/or the video recording are provided as input to the one or more AI computer models 126 which generate the "What's New" container 140 which in turn generates a "What's New" functional component when the container 140 is executed at the client computing device 160. As previously mentioned above, it should be appreciated that the container 140 generation is not part of the actual development cycle for the new feature of the application, but rather is provided by the improved computing tool of the illustrative embodiments as a separate service such that the developers need not spend resources and time generating the "What's New" function for the deployment of the new feature to the application instances at client computing device(s) 160. The deployment of the "What's New" container 140 will fall in line with the actual release cycle of the new feature for the application such that the "What's New" functionality provided by the container 140 executes in parallel to the functional release. Thus, from the product/application development standpoint, there is a one-time operation to allocate a required portion of the application display, e.g., GUI real estate, for use by the "What's New" functionality of the service provided by the improved computing tool of the illustrative embodiments, link the allocated portion of the application display with the "What's New" container, and import the required theme and skins of the "What's New" feature, such as when the client computing device 160 registers with the service.

Once the application display portion has been allocated, the "What's New" container 140 is linked, and the required theme/skins are imported by container daemon 150 executing on the client computing device 160, whenever there is a new release with new features/functionality implemented in the application 164, the corresponding "What's New" container 140 may be automatically executed by the container daemon 150 to provide an automatically generated "What's New" functionality for the new release and new features/functionality, including video content demonstrating the operation of the new feature(s) as indicated by the recorded selectors associated with the new feature(s). Thus, an automated mechanism for generating content to explain and demonstrate new features/functionality of an application release is made possible.

In some illustrative embodiments, the "What's New" container 140 comprises computer executable logic that provides an artificial intelligence (AI) avatar 142, in addition to or instead of the multimedia (e.g., video/audio) content, to demonstrate the new features and which utilizes natural language conversation with natural expressions. In such a case, natural language processing tools, text-to-audio conversion tools, conversational bot services, and the like, may be used to provide an AI avatar 142 interaction. The AI avatar 142 may be personal to the user and the conversation(s) between the user and the AI avatar 142 may be recorded and stored in association with the user profile such that the user can, in future conversations with the AI avatar 142, reference past conversations regarding the newly released feature.

In some illustrative embodiments, the "What's New" container 140 comprises logic that generates a guided tour 144 of the new features of a release of the application 164. In such illustrative embodiments, the "What's New" container 140 holds the executable client side script, which explains the new feature by navigating through the application along with associated help text while on navigation. The execution of the client side script may be performed using an application environment that does not change the state of the client computing device 160, e.g., the new feature demonstration may be provided in a sandbox type environment so that it does not impact the current state of the client computing device 160 and is provided only for demonstration purposes. The executable client-side script is generated based on the element selectors used by the automation team while automating the new feature, as described above, via the automation suite/execution computing tool 130. The associated text is generated by the text content associated with elements of the hierarchical feature computer model using the textual content extracted from the development documentation data structures 112-116 from the various development teams.

In some illustrative embodiments, the "What's New" container 140 provides a playback of multimedia content (e.g., video/audio) comprising a screen recording with associated audio 144, explaining the new feature. The video content is generated from the feed of automation test case screen recordings from the automated suite/execution computing tool 130 and script/recorded video generator 124, as previously described above. Audio content is generated from the hierarchical feature computer model generated by the model generator 122 based on the development documentation data structures 112-116. For example, text-to-speech operations may be performed on textual content, extracted from the development documentation data structures 112-116, corresponding to portions of the hierarchical feature computer model that are correlated with the portions of the video content representing the new feature(s).

Thus, to summarize, the "What's New" container generator 100 may be plugged into an integrated development environment (IDE), such as via the automated suite/execution computing tool 130 of the IDE (not shown), in which the code generation and test case generation is performed. The "What's New" container generator 100 of the illustrative embodiments records the automation test case steps and identifies/records the element locators of the selectors associated with the test cases. In addition, video content may be recorded while the automation test case is running. These element locators are used by the "What's New" container of the illustrative embodiments to automatically generate a guided tour, for example. The illustrative embodiments receive the development documentation data structures 112-116 produced by the business level individuals, e.g., product manager, the developers or coders, and the automation engineers, along with the recorded automation selectors and the recorded video. The illustrative embodiments perform AI computations and analysis, based on machine learning trained computer models, on this information and produce an output of a "What's New" container 140 for the new feature, tied to the new feature.

This "What's New" container may provide one or more types of "What's New" content based on the desired implementation. For example, the end user of client computing device 160 can make use of the "What's New" container functionality in one or more of a plurality of implementations based on configuring the container daemon 150 to execute the corresponding content of the "What's New" container 140. In one illustrative embodiment, the "What's New" content may be provided as an AI avatar 142. In another illustrative embodiment, the "What's New" content may be provided as a guided tour 144. In yet another illustrative embodiment, the "What's New" content may be provided as a recorded video playback 146.

The user, when she has configured the daemon 150 and/or "What's New" container 140 with the first option for "What's New" content, and when she clicks on the What's New feature in the application 164 displayed interface via device 162, is presented with an AI based avatar with which she can speak or type commands and/or ask questions, such as "tell me the about the new feature offered." The AI avatar, which may implement natural language process, speech-to-text and text-to-speech functionality, as well as artificial intelligence processing of such speech/text to generate answers. The AI avatar responds to the command/question by explaining the new functionality within the product (application 164), such as where and how it is used. In some illustrative embodiments, for the queries that cannot be handled by the AI Avatar, the AI avatar may dynamically guide users with a floating chat window to an appropriate user from development/tester teams who is associated with that feature. In some illustrative embodiments, the "What's New" container's AI avatar implements a self-learning capability by having intent-response analysis on the conversation between end user vs associated team to update the model accordingly for answer future queries.

In the case where the user configures the daemon 150 and/or "What's New" container 140 with the second option, a guided tour 144 will be shown, which uses the element selectors recorded during the execution of the test cases. Lastly, when the user configures the daemon 150 and/or "What's New" container 140 with the third option, a recorded video 146 of the new feature functionality will be played along with the audio.

In some illustrative embodiments, as a further feature, the improved computing tool of the illustrative embodiments may provide the "What's New" container 140 as a service to app-based frameworks where the user only needs to update the application in their client device from an application distribution service prior to updating the application to implement the new feature. In this case, the application may be provided with a container daemon process 150, such as a Docker daemon or other virtual container process that operates to implement virtual containers, that may be specific to "What's New" containers 140. Thus, when a new feature is generated for the application, the illustrative embodiments may push/update the application 164 with the specific "What's New" container 140 for the new feature, thereby implementing the associated AI Avatar 142, guided tour 144, video/audio replay 146, and executable logic of the "What's New" container 140 as a new features chime. Thus, the user can experience the "What's New" feature content for the new feature of the application prior to updating the application itself. In such a situation, the user is able to experience the new feature even without updating the application so that the user can determine whether they actually want the new feature or not and can update, or not update, the application accordingly.

Figure 2:
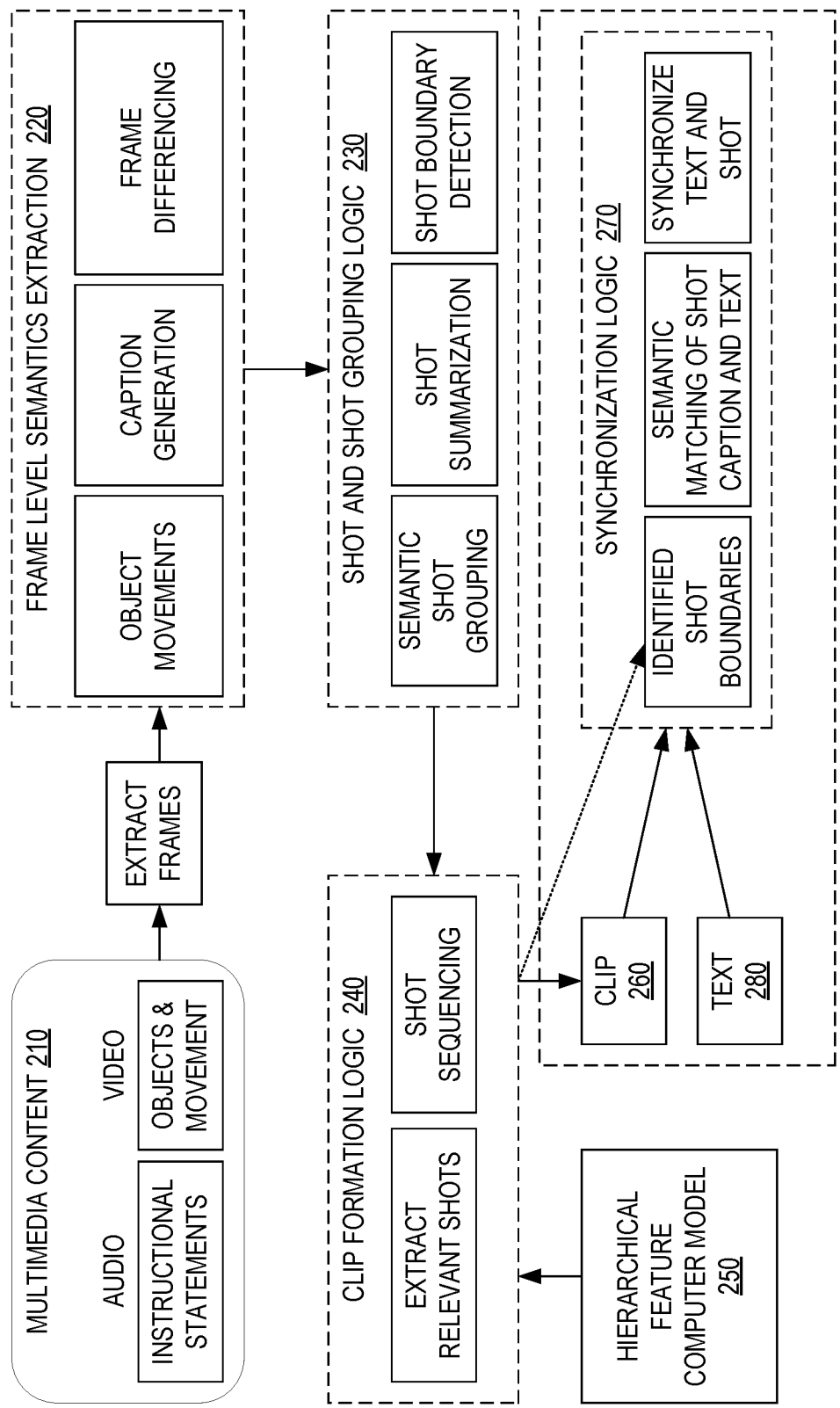
FIG. 2 is an example block diagram of a machine learning based mechanism to extract a clip from video content based on a user query in accordance with one illustrative embodiment.

FIG. 2 is an example block diagram of a machine learning based mechanism to extract a clip from video content based on a user query in accordance with one illustrative embodiment. The operation shown in FIG. 2 may be performed as part of the AI computer model 126 logic to correlate executable client script, video recording, and textual content corresponding to hierarchical feature computer model elements. As shown in FIG. 2, the operation involves a plurality of stages of computer logic to process the video content frames into shots and shot groups based on caption or other metadata, which may comprise selector descriptors or the like. Thus, for example, the video and/or audio content 210 may be processed to extract frames from the video and/or audio content 210. The frames are processed through frame level semantics extraction logic 220 to identify object movements, generate captions using speech-to-text, optical character reading (OCR), or other image analysis, and perform frame differencing that identifies differences between sequential frames. Based on this differentiation of frames, captions, and/or other metadata associated with the frames, the frames are converted to individual shots and shot groups by shot and shot grouping logic 230. The logic 230 uses semantic shot grouping, shot summarization, and shot boundary detection logic to identify these shots and shot groupings.

The resulting shots and shot groupings are provided to the clip formation logic 240 that generates video/audio clips relevant to the new features present in the hierarchical feature computer model 250. The clip formation logic 240 takes the hierarchical feature computer model 250 as an input and correlates the textual content corresponding to the nodes of the hierarchical feature computer model 250 with metadata associated with the shots and shot groupings to thereby extract relevant shots to the new feature(s) and perform shot sequencing to form the video clip 260. The video clip 260 is provided to synchronization logic 270 along with textual descriptions 280 generated based on textual content extracted from the development documentation data structures 112-116 correlated with nodes of the hierarchical feature computer model, and template data structures 282 that are populated with the textual content. The synchronization logic 270 identifies shot boundaries, performs semantic matching of the shot or shot group metadata, e.g., captions, with the textual descriptions 280, and synchronizes the textual descriptions 280 with the shots or shot groups in the video clip 260. It should be appreciated that this synchronized text can then be used to generate the pop-up text boxes or other displayed textual content of the guided tour provided by the "What's New" container 140. Moreover, the synchronized text may also be used to drive an audio output of a guided tour or an AI avatar using a speech-to-text conversion operation to thereby provide an audio description of what is being shown in the video.

Figure 3:
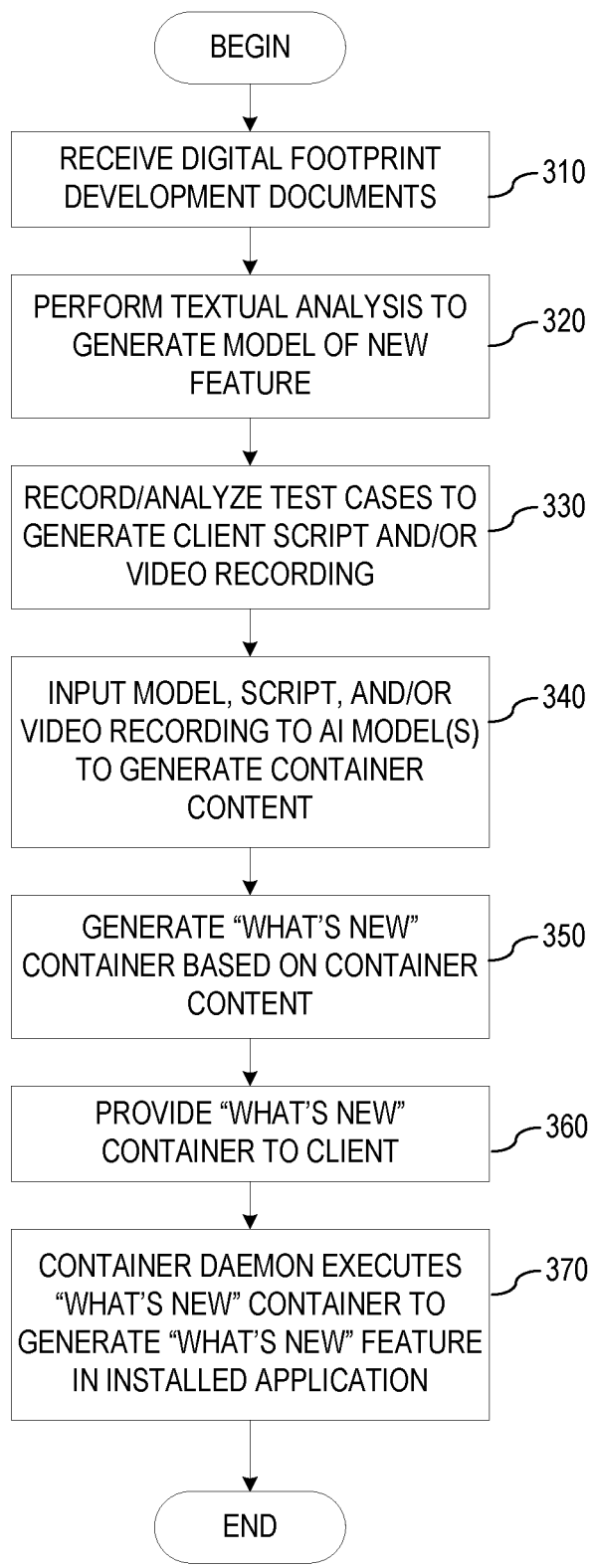
FIG. 3 is a flowchart outlining an overall operation for generating a "What's New" container in accordance with one illustrative embodiment.

FIG. 3 is a flowchart outlining an overall operation for generating a "What's New" container in accordance with one illustrative embodiment. The operations outlined in FIG. 3 may be implemented, for example, by the various components of the "What's New" container generator 100 as described above.

As shown in FIG. 3, the operation starts by receiving the digital footprint for the new feature, which may comprise the developer documentation data structures from the development document storage (step 310). Text analysis is executed on the document data structures to generate a model of the new feature functionality (step 320). Test case implementation via an automation suite/execution computing tool is recorded and selector identification is performed to generate a client script and recorded video (step 330). The model, script, and recorded video are input to one or more AI computer models that generate "What's New" container content (step 340). The "What's New" container content is provided to a container engine 128 that uses container templates to generate a "What's New" container (step 350). The "What's New" container is sent to one or more client computing devices on which the application corresponding to the new feature are installed (step 360). A container daemon process on the client computing device(s) executes the "What's New" container to generate a "What's New" feature functionality within the installed application (step 370). The operation then terminates.

Thus, the illustrative embodiments may be utilized in many different types of data processing environments. In order to provide a context for the description of the specific elements and functionality of the illustrative embodiments, FIGS. 8 and 9 are provided hereafter as example environments in which aspects of the illustrative embodiments may be implemented. It should be appreciated that FIGS. 8 and 9 are only examples and are not intended to assert or imply any limitation with regard to the environments in which aspects or embodiments of the present invention may be implemented. Many modifications to the depicted environments may be made without departing from the spirit and scope of the present invention.

Figure 4:
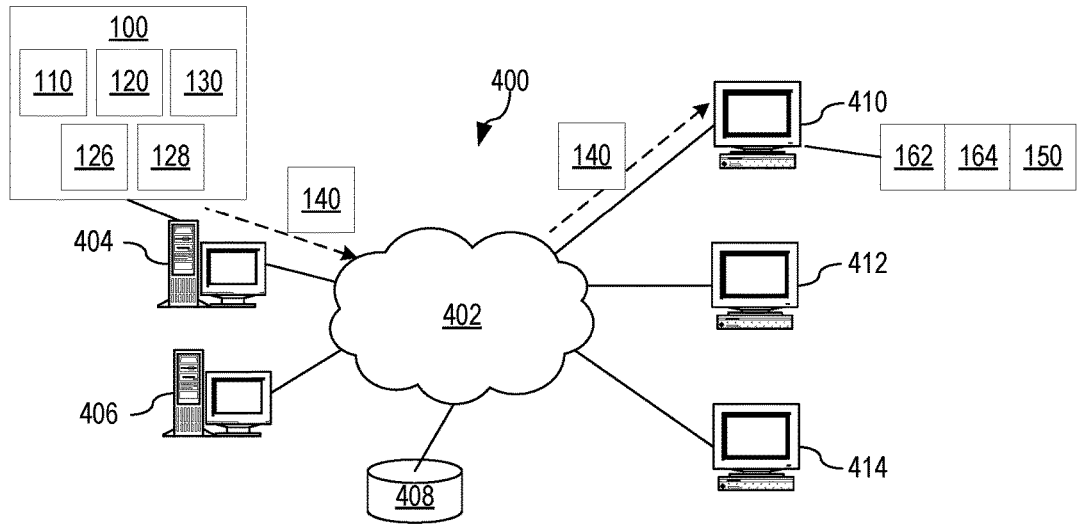
FIG. 4 is an example diagram of a distributed data processing system in which aspects of the illustrative embodiments may be implemented.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404, may be specifically configured to implement a what-is-new container generator and deployment mechanism, such as one or more elements of system 100 in FIG. 1. Moreover, one or more of the client computing devices, e.g., client 410, may be configured to implement the I/O device(s) 162, execute the application 164, and execute the container daemon 150 in FIG. 1. The container daemon 150 may receive "What's New" containers, e.g., "What's New" container 140, from the server computing system 404, and execute the "What's New" functionality provided therein, as described previously.

It should be appreciated that the configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should also be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated generation of a what-is-new container and deployment of the resulting what-is-new container.

Figure 5:
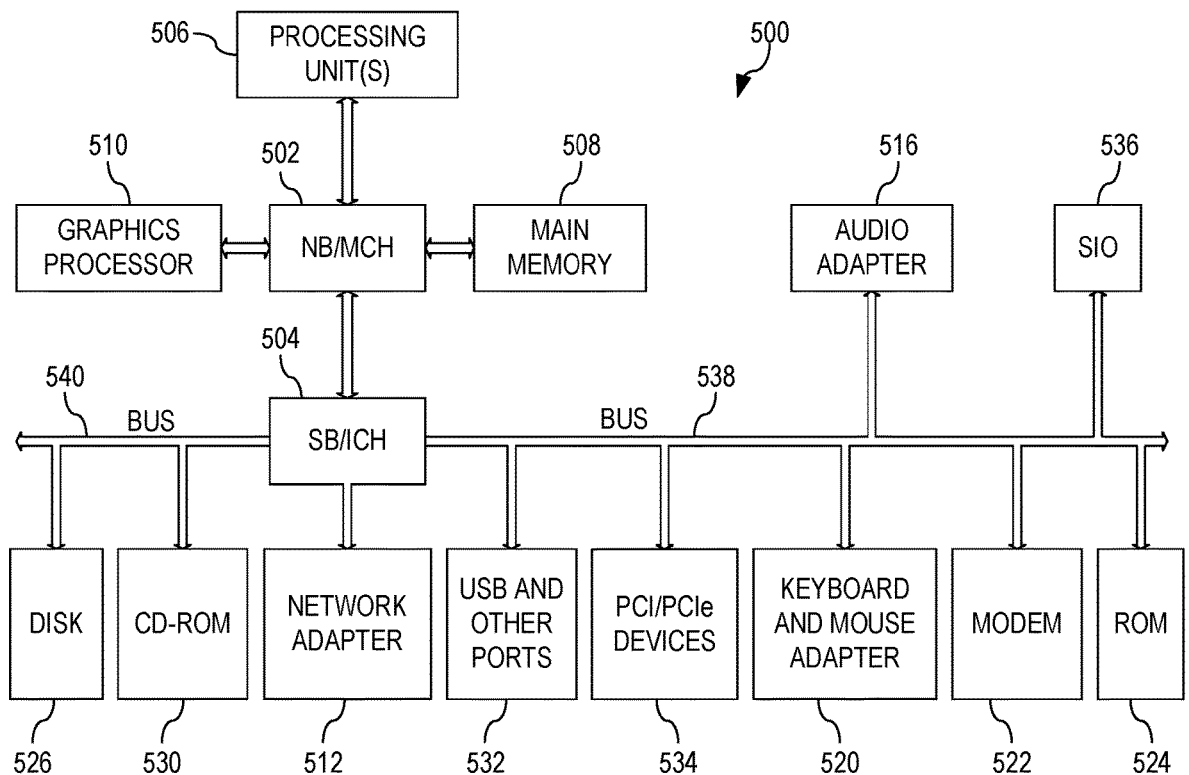
FIG. 5 is an example block diagram of a computing device in which aspects of the illustrative embodiments may be implemented.

As noted above, the mechanisms of the illustrative embodiments utilize specifically configured computing devices, or data processing systems, to perform the operations for generating a what-is-new container and deploying the resulting what-is-new container. These computing devices, or data processing systems, may comprise various hardware elements which are specifically configured, either through hardware configuration, software configuration, or a combination of hardware and software configuration, to implement one or more of the systems/subsystems described herein. FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System p® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the generation of a what-is-new container and deployment of the resulting what-is-new container.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

Thus, the illustrative embodiments provide mechanisms for automatically generating a "What's New" feature in existing applications to demonstrate new functionality to users. The "What's New" feature mechanisms of the illustrative embodiments may be implemented using containers that provide a plug-and-play capability, thereby eliminating the need to invest time and human effort in generating custom "What's New" content for different applications. The illustrative embodiments employ artificial intelligence computer models that are trained through machine learning processes to analyze the digital footprint of the development of the new features as an input to generating a model of the new feature that is then analyzed to automatically determine the "What's New" feature content that is to be presented to the user. This content may include an AI avatar, a guided tour, and/or a video/audio playback demonstrating the new functionality provided by the new feature.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for automatically generating a user interactable what-is-new feature for an updated application, the method comprising:

obtaining footprint data from electronic documents generated during a software development lifecycle to generate an update to an application, wherein the footprint data specifies development requirements and actions performed by at least application developers during the software development lifecycle;

obtaining test case generation data from a recording of test case generation interactions with a graphical user interface;

executing computer natural language processing on the footprint data and analysis of the recording of the test case generation interactions to automatically generate a what-is-new container for the update to the application; and deploying the what-is-new container to a client computing device that executes a container daemon to implement a what-is-new feature for the updated application installed on the client computing device.

2. The method of claim 1, wherein the footprint data comprises a business level specification document data structure specifying business level requirements for at least one new feature in the update to the application, a developer documentation data structure comprising documentation of actions taken to develop code for implementing the at least one new feature, and test case generation documentation documenting actions taken to generate test cases for testing the at least one new feature.

3. The method of claim 1, wherein automatically generating the what-is-new container further comprises generating a hierarchical feature computer model specifying features or functionality of the update to the application in a hierarchical representation with nodes representing features or functionality and edges representing relationships between features or functionality.

4. The method of claim 3, wherein automatically generating the what-is-new container comprises:
correlating, by at least one machine learning trained artificial intelligence computer model, portions of the hierarchical representation with portions of the recording of the test case generation interactions to generate correlated portions; and
generating at least one of a guided tour content, an artificial intelligence avatar content, or a multimedia package for inclusion in the what-is-new container based on the correlated portions.

5. The method of claim 4, wherein executing analysis of the recording of the test case generation interactions comprises generating at least one of an executable client script based on the recorded test case generation interactions or a video recording of the test case generation interactions.

6. The method of claim 5, wherein correlating portions of the hierarchical representation with portions of the recording comprises correlating portions of textual content extracted from the footprint data and with portions of recorded test case generation interactions in the at least one of the executable client script or the video recording.

7. The method of claim 4, wherein automatically generating the what-is-new container comprises generating guided tour content that provides a guided tour of new functionality or new features of the update to the application, and wherein the guided tour content comprises textual descriptions of the new functionality or new features extracted from the footprint data by the natural language processing and correlated with the portions of the hierarchical representation and recording of the test case generation interactions.

8. The method of claim 4, wherein automatically generating the what-is-new container comprises generating artificial intelligence avatar content that provides an artificial intelligence avatar to interact with a user to respond to requests regarding new functionality or new features of the update to the application, and wherein the artificial intelligence avatar content comprises audio content generated based on a speech-to-text operation executed on textual descriptions of the new functionality or new features extracted from the footprint data by the natural language processing and correlated with the portions of the hierarchical representation and recording of the test case generation interactions.

9. The method of claim 4, wherein automatically generating the what-is-new container comprises generating multimedia content that provides a playback of video and audio describing new functionality or new features of the update to the application, and wherein the multimedia content comprises a video recording of the test case generation interactions synchronized with audio content generated based on a speech-to-text operation executed on textual descriptions of the new functionality or new features extracted from the footprint data by the natural language processing and correlated with the portions of the hierarchical representation and recording of the test case generation interactions.

10. The method of claim 1, wherein executing analysis of the recording of the test case generation interactions comprises recording selectors of an integrated development environment used to generate the test case.

11. A computer program product comprising a computer readable storage medium having a computer readable program stored therein, wherein the computer readable program, when executed on a computing device, causes the computing device to:
obtain footprint data from electronic documents generating during a software development lifecycle to generate an update to an application, wherein the footprint data specifies development requirements and actions performed by at least application developers during the software development lifecycle;
obtain test case generation data from a recording of test case generation interactions with a graphical user interface;
execute computer natural language processing on the footprint data and analysis of the recording of the test case generation interactions to automatically generate a what-is-new container for the update to the application; and
deploy the what-is-new container to a client computing device that executes a container daemon to implement a what-is-new feature for the updated application installed on the client computing device.

12. The computer program product of claim 11, wherein the footprint data comprises a business level specification document data structure specifying business level requirements for at least one new feature in the update to the application, a developer documentation data structure comprising documentation of actions taken to develop code for implementing the at least one new feature, and test case generation documentation documenting actions taken to generate test cases for testing the at least one new feature.

13. The computer program product of claim 11, wherein automatically generating the what-is-new container further comprises generating a hierarchical feature computer model specifying features or functionality of the update to the application in a hierarchical representation with nodes representing features or functionality and edges representing relationships between features or functionality.

14. The computer program product of claim 13, wherein automatically generating the what-is-new container comprises:
correlating, by at least one machine learning trained artificial intelligence computer model, portions of the hierarchical representation with portions of the recording of the test case generation interactions to generate correlated portions; and
generating at least one of a guided tour content, an artificial intelligence avatar content, or a multimedia package for inclusion in the what-is-new container based on the correlated portions.

15. The computer program product of claim 14, wherein executing analysis of the recording of the test case generation interactions comprises generating at least one of an executable client script based on the recorded test case generation interactions or a video recording of the test case generation interactions.

16. The computer program product of claim 15, wherein correlating portions of the hierarchical representation with portions of the recording comprises correlating portions of textual content extracted from the footprint data and with portions of recorded test case generation interactions in the at least one of the executable client script or the video recording.

17. The computer program product of claim 14, wherein automatically generating the what-is-new container comprises generating guided tour content that provides a guided tour of new functionality or new features of the update to the application, and wherein the guided tour content comprises textual descriptions of the new functionality or new features extracted from the footprint data by the natural language processing and correlated with the portions of the hierarchical representation and recording of the test case generation interactions.

18. The computer program product of claim 14, wherein automatically generating the what-is-new container comprises generating artificial intelligence avatar content that provides an artificial intelligence avatar to interact with a user to respond to requests regarding new functionality or new features of the update to the application, and wherein the artificial intelligence avatar content comprises audio content generated based on a speech-to-text operation executed on textual descriptions of the new functionality or new features extracted from the footprint data by the natural language processing and correlated with the portions of the hierarchical representation and recording of the test case generation interactions.

19. The computer program product of claim 14, wherein automatically generating the what-is-new container comprises generating multimedia content that provides a playback of video and audio describing new functionality or new features of the update to the application, and wherein the multimedia content comprises a video recording of the test case generation interactions synchronized with audio content generated based on a speech-to-text operation executed on textual descriptions of the new functionality or new features extracted from the footprint data by the natural language processing and correlated with the portions of the hierarchical representation and recording of the test case generation interactions.

20. An apparatus comprising:
a processor; and
a memory coupled to the processor, wherein the memory comprises instructions which, when executed by the processor, cause the processor to:
obtain footprint data from electronic documents generating during a software development lifecycle to generate an update to an application, wherein the footprint data specifies development requirements and actions performed by at least application developers during the software development lifecycle;
obtain test case generation data from a recording of test case generation interactions with a graphical user interface;
execute computer natural language processing on the footprint data and analysis of the recording of the test case generation interactions to automatically generate a what-is-new container for the update to the application; and
deploy the what-is-new container to a client computing device that executes a container daemon to implement a what-is-new feature for the updated application installed on the client computing device.

* * * * *